Nov. 4, 1952 — J. B. TIEDEMANN — 2,616,164
METHOD OF FORMING DIAPHRAGM VALVE BODIES
Filed May 8, 1948
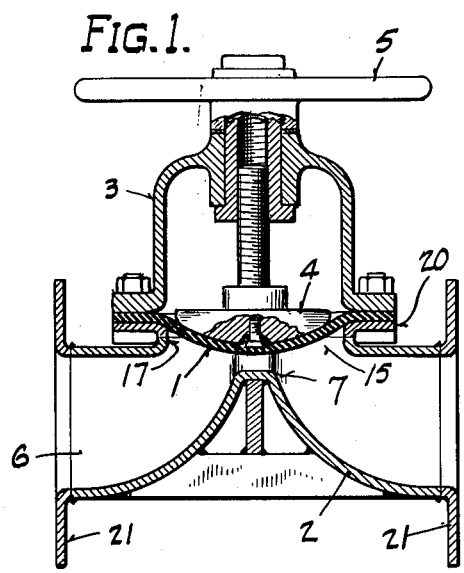
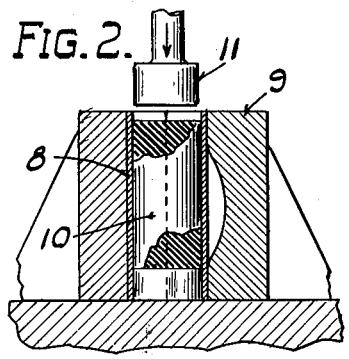
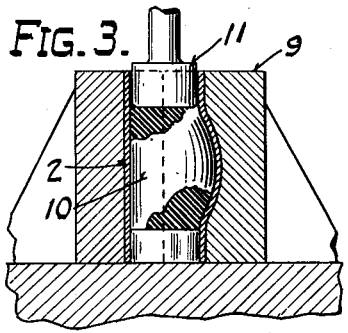
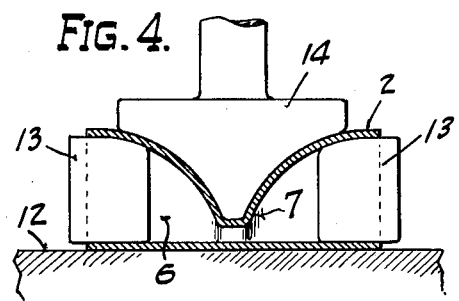
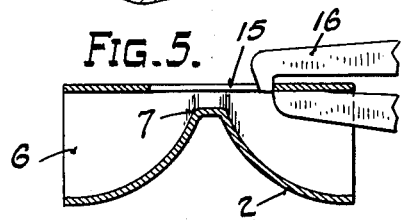
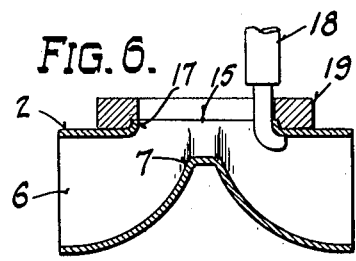
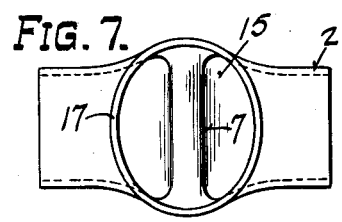
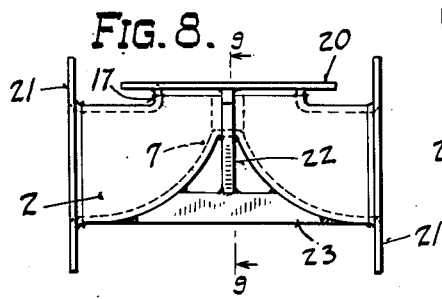
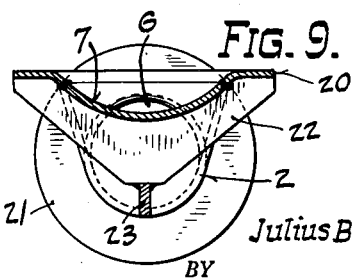
INVENTOR.
Julius B. Tiedemann
BY Andrus & Scales
ATTORNEYS.

Patented Nov. 4, 1952

2,616,164

UNITED STATES PATENT OFFICE 2,616,164

METHOD OF FORMING DIAPHRAGM VALVE BODIES

Julius B. Tiedemann, Milwaukee, Wis., assignor to A. O. Smith Corporation, Milwaukee, Wis., a corporation of New York Application May 8, 1948, Serial No. 25,866

1 Claim. (Cl. 29—157.1)

This invention relates generally to a diaphragm valve and particularly to a method of forming the valve body therefor.

The body of a diaphragm valve is generally provided with a substantially continuous longitudinal passage or bore intersected by a weir extending across the width of the passage. The weir extends part way of the depth of the passage and is generally formed with a concave upper face which acts as a seat for a diaphragm to regulate the flow of fluid passing through the valve.

It has been the general practice to form bodies for diaphragm valves by casting. This is a slow and expensive procedure resulting in heavy valve bodies with a consequent wastage of metal.

One of the principal objects of the invention is to provide a diaphragm valve having a valve body formed from tubular stock.

Another object is the provision of a valve body from tubular stock by simple forming operations.

Another object is to provide a valve body for a diaphragm valve from thin walled tubular stock which is of light weight.

Another object is to provide a valve body which is free from certain imperfections sometimes found in articles which are cast in sand.

A further object is to provide a valve body which is economical to manufacture.

Other objects and advantages of the invention will appear hereinafter.

The invention is illustrated in the accompanying drawing in which:

Figure 1 is a longitudinal sectional elevation of a diaphragm valve showing the relationship of a partially lowered diaphragm to the weir as when the valve is being throttled;

Fig. 2 is a central vertical section showing a length of tubular stock in a forming press prior to the first step of the invention;

Fig. 3 is a view similar to Fig. 2 showing a partially formed valve body;

Fig. 4 is a longitudinal sectional elevation of a partially formed valve body showing the forming of the weir;

Fig. 5 is a longitudinal sectional elevation of a partially formed valve body showing the removal of a portion of the body prior to the formation of a top flange supporting bead;

Fig. 6 is a view similar to Fig. 5 showing the forming of a bead for supporting a top flange;

Fig. 7 is a top plan view of the valve body of Fig. 6;

Fig. 8 is a front elevational view of a valve body with top and end flanges; and Fig. 9 is a transverse section taken on line 9—9 of Fig. 8.

Diaphragm valves generally comprise three parts, an upper bonnet assembly, a flexible diaphragm and a valve body. The diaphragm 1 is usually clamped circumferentially between the valve body 2 and the bonnet 3 and may be secured to a convex compressor plate 4 actuated by turning a handwheel 5 which forms part of the bonnet assembly. Figure 1 shows the relationship of the various parts in a valve of the diaphragm type.

The valve body 2 has a substantially continuous straight-through bore or passage 6 which is intersected by a weir 7. The upper face of the weir is concaved substantially complemental to the convex compressor plate and cooperates with the flexible diaphragm 1 to regulate the flow of fluid through the valve.

In forming the valve body 2, a length of metal tubular stock 8 is placed within a press having a die 9 of suitable configuration, as shown in Fig. 2. A cylindrical mass of rubber 10, of proper consistency, is placed within the tubing and is pressed downwardly by plunger 11 thereby expanding the tubing 8 to the configuration of die 9. Depending upon the metal used, the tubular stock may be either hot worked or cold worked. If it is desired to hot work the stock, an inert gas may be used to expand the stock to the shape of die 9 instead of using a mass of rubber 10, as is shown in the drawing. It will be noted that one side of the die 9 is longitudinally straight while the remainder of the die is of substantially spherical configuration.

Upon completion of the first or expanding step of the invention, the valve body 2 is removed from die 9 and placed with the longitudinally straight side downwardly on a suitable support 12. A mandrel 13 is then inserted into each end of the body 2 to prevent collapse of the ends and a plunger 14 of suitable configuration is forced against the expanded or spherical portion of valve body 2 to form weir 7 intermediate the ends of the body. As is the case in the first forming step, the tubular stock may be either hot worked or cold worked, the substituting of an inert gas for mandrels 7 within the body being necessary if hot working is preferred.

An opening 15 for the diaphragm is then made in the longitudinally straight side of body 2. This may be accomplished by removing a portion of metal by a burning operation or by utilizing a shear punch 16, as shown in Fig. 5. A flange supporting rim 17 is next upturned from the edge of the opening by any suitable means, the pneumatic hammer 18 and cooperating backing ring 19, as shown in Fig. 6 of the drawing, being merely illustrative of one way of performing this operation.

A flange member 20, for supporting the upper bonnet assembly, is secured to rim 17 preferably by welding. End flanges 21 are likewise joined to each open end of body member 2 for connecting the valve in the line.

If desired, a suitable transverse web member 22 and longitudinal web member 23 may be added to the valve body by welding the same thereto to additionally strengthen the valve body in service.

The valve body may be lined with any suitable corrosion resistant material such as ceramic enamel. A corrosion resisting lining is desirable when the valve is to be used in an installation for transferring fluids which may have a strong corrosive action on the metal of the valve body. The valve body also may be made from stainless steel or the like.

The invention provides a generally lightwegiht valve body fabricated from tubular metal stock by several relatively simple forming operations to decrease costs over the cast body and, in fact, increasing the strength and durability of the body for unit weight of metal employed.

Various embodiments of the invention may be employed within the scope of the accompanying claim.

I claim:

The method of press-forming a valve body for use in a diaphragm valve which comprises expanding a portion of tubular stock circumferentially intermediate the ends thereof, providing a raised transverse weir within said tubular stock by forming inwardly said expanded portion, and providing an opening in said tubular stock opposite said weir.

JULIUS B. TIEDEMANN.

REFERENCES CITED

The following references are of record in the file of this patent:

UNITED STATES PATENTS

| Number | Name | Date |
| --- | --- | --- |
| 1,638,546 | Murray | Aug. 9, 1927 |
| 2,100,438 | Forrester | Nov. 30, 1937 |
| 2,122,957 | Santamaria | July 5, 1938 |
| 2,191,863 | Saunders | Feb. 27, 1940 |
| 2,283,369 | Jacobsen | May 19, 1942 |
| 2,302,930 | Anderson | Nov. 24, 1942 |
| 2,363,943 | Carlson | Nov. 28, 1944 |
| 2,429,602 | Boteler | Oct. 28, 1947 |
| 2,418,447 | Arbogast | Apr. 8, 1947 |